US010465543B2

(12) United States Patent
Hagan et al.

(10) Patent No.: US 10,465,543 B2
(45) Date of Patent: Nov. 5, 2019

(54) FLOW DIRECTING COVER FOR ENGINE COMPONENT

(71) Applicant: UNITED TECHNOLOGIES CORPORATION, Farmington, CT (US)

(72) Inventors: Benjamin F. Hagan, Manchester, CT (US); Ryan Alan Waite, Glastonbury, CT (US); Bryan P. Dube, Columbia, CT (US); Lane Thornton, Ellington, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 59 days.

(21) Appl. No.: 15/810,279

(22) Filed: Nov. 13, 2017

(65) Prior Publication Data

US 2018/0066532 A1 Mar. 8, 2018

Related U.S. Application Data

(63) Continuation of application No. 14/693,359, filed on Apr. 22, 2015, now Pat. No. 9,845,694.

(51) Int. Cl.
| *F01D 5/14* | (2006.01) |
|---|---|
| *F01D 9/06* | (2006.01) |
| *F01D 5/18* | (2006.01) |
| *F01D 9/04* | (2006.01) |

(52) U.S. Cl.
CPC ............ *F01D 9/065* (2013.01); *F01D 5/147* (2013.01); *F01D 5/186* (2013.01); *F01D 5/187* (2013.01); *F01D 5/188* (2013.01); *F01D 9/041* (2013.01); *F05D 2240/125* (2013.01); *F05D 2240/307* (2013.01); *F05D 2240/81* (2013.01); *F05D 2250/75* (2013.01); *Y02T 50/676* (2013.01)

(58) Field of Classification Search
CPC .......... F01D 5/186; F01D 5/187; F01D 9/065; F01D 9/041
See application file for complete search history.

(56) References Cited

U.S. PATENT DOCUMENTS

| 5,562,404 | A | 10/1996 | Koff et al. |
|---|---|---|---|
| 6,220,012 | B1 | 4/2001 | Hauser et al. |
| 6,955,523 | B2 * | 10/2005 | McClelland ............. F01D 5/14 415/115 |
| 7,704,046 | B1 | 4/2010 | Liang |
| 7,775,769 | B1 * | 8/2010 | Liang .................... F01D 5/187 415/115 |
| 7,785,072 | B1 * | 8/2010 | Liang .................... F01D 5/187 416/97 R |

(Continued)

FOREIGN PATENT DOCUMENTS

GB 479427 A 1/1938

*Primary Examiner* — Woody A Lee, Jr.
(74) *Attorney, Agent, or Firm* — Carlson, Gaskey & Olds, P.C.

(57) ABSTRACT

An assembly for a gas turbine engine according to an exemplary aspect of the present disclosure includes, among other things, an airfoil including a radial end, a first passageway having an outlet at the radial end, and a second passageway having an inlet at the radial end. The assembly further includes a cover having at least one turning cavity configured to direct fluid expelled from the outlet of the first passageway into the inlet of the second passageway.

14 Claims, 3 Drawing Sheets

(56) References Cited

U.S. PATENT DOCUMENTS

| | | | |
|---|---|---|---|
| 8,016,547 B2 | 9/2011 | Propheter-Hinckley | |
| 8,083,485 B2 | 12/2011 | Chon et al. | |
| 8,282,341 B2 | 10/2012 | Freeman et al. | |
| 8,511,968 B2 | 8/2013 | Liang et al. | |
| 8,517,667 B1 | 8/2013 | Liang | |
| 8,821,111 B2 * | 9/2014 | Gear | F01D 5/187 415/115 |
| 8,870,524 B1 * | 10/2014 | Liang | F01D 9/065 415/115 |
| 2009/0068023 A1 * | 3/2009 | Liang | F01D 5/186 416/97 R |
| 2009/0324423 A1 * | 12/2009 | Liang | F01D 5/186 416/97 R |

* cited by examiner

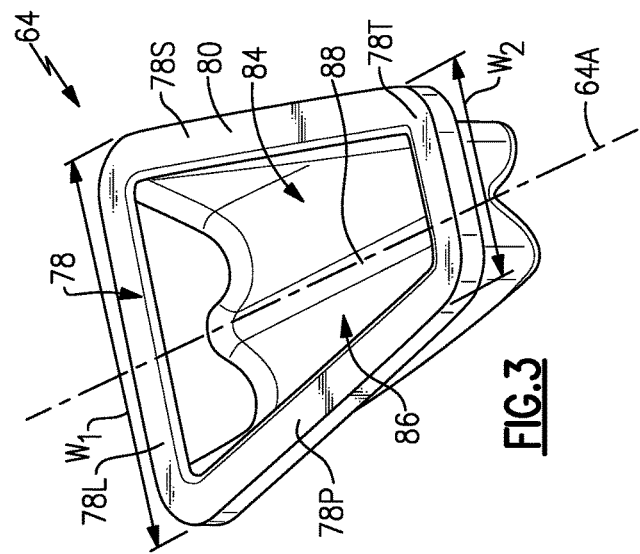
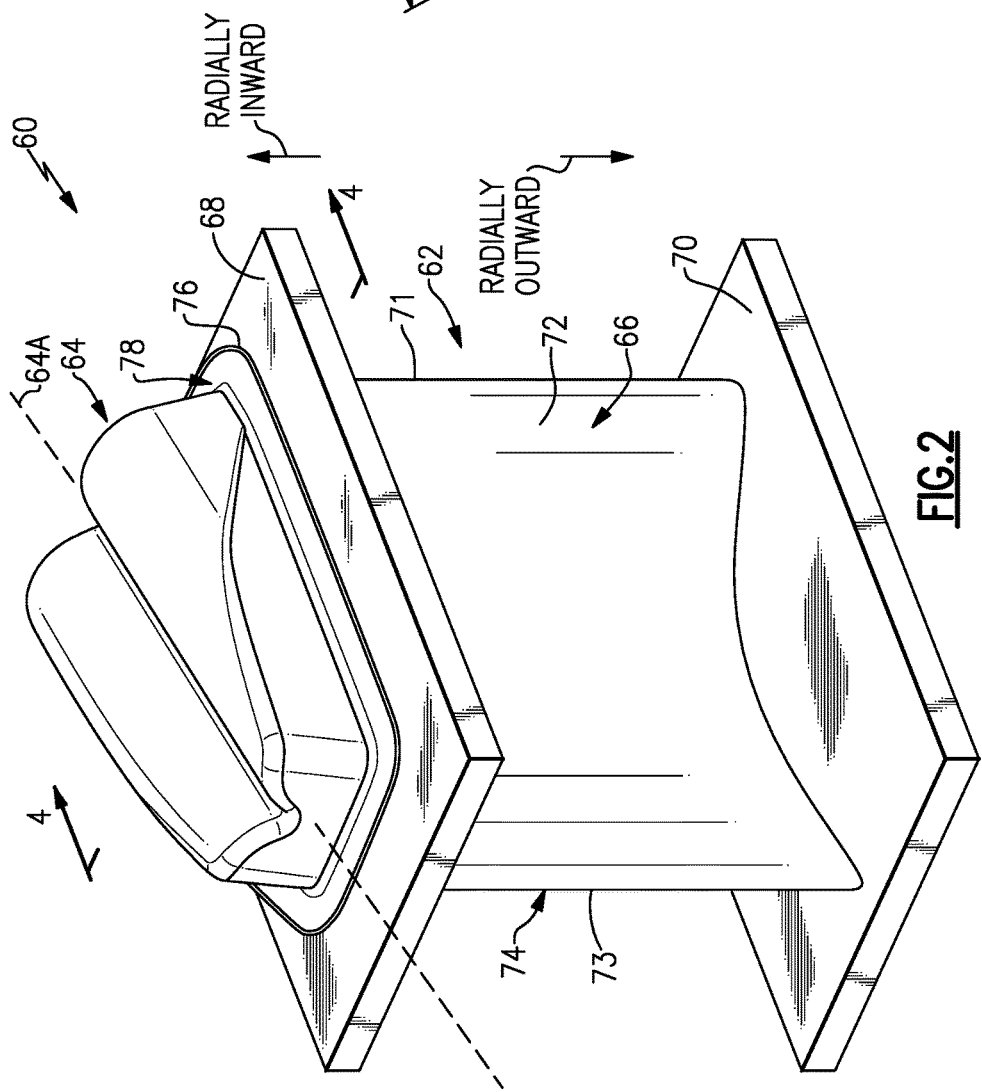

FLOW DIRECTING COVER FOR ENGINE COMPONENT

RELATED APPLICATIONS

This disclosure is a continuation of prior U.S. application Ser. No. 14/693,359, filed Apr. 22, 2015, the entirety of which is herein incorporated by reference.

STATEMENT REGARDING GOVERNMENT SUPPORT

This invention was made with government support under Contract No. FA8650-09-D-2923-0021 awarded by the United States Air Force. The government has certain rights in this invention.

BACKGROUND

Gas turbine engines typically include a compressor section, a combustor section, and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections may include alternating arrays of rotating blades and stationary vanes that extend into the core airflow path of the gas turbine engine. For example, in the turbine section, turbine blades rotate and extract energy from the hot combustion gases that are communicated along the core airflow path. The turbine vanes guide the airflow and prepare it for the downstream set of blades.

Turbine vanes are known to include internal passageways configured to direct a flow of cooling fluid within the interior of the vane. The flow of cooling fluid protects the vane from the relatively hot fluid in the core airflow path. One known type of internal passageway is a serpentine passageway, which typically includes a plurality of radially extending passageways connected by turning portions. Serpentine passageways are formed within an interior of an airfoil section of the vane, and are often formed integrally with the remainder of the vane using an investment casting process, for example.

SUMMARY

An assembly for a gas turbine engine according to an exemplary aspect of the present disclosure includes, among other things, an airfoil including a radial end, a first passageway having an outlet at the radial end, and a second passageway having an inlet at the radial end. The assembly further includes a cover having at least one turning cavity configured to direct fluid expelled from the outlet of the first passageway into the inlet of the second passageway.

In a further embodiment of the foregoing assembly, the cover includes a first turning cavity and a second turning cavity, the airfoil includes a third passageway having an inlet at the radial end, the first turning cavity is configured to direct a first portion of the fluid expelled from the outlet of the first passageway into the inlet of the second passageway, and the second turning cavity is configured to direct a second portion of the fluid expelled from the outlet of the first passageway into the inlet of the third passageway.

In a further embodiment of the foregoing assembly, the cover includes a flow divider between the first turning cavity and the second turning cavity.

In a further embodiment of the foregoing assembly, the flow divider is substantially convex and the first and second turning cavities are substantially concave when viewed from an interior of the cover.

In a further embodiment of the foregoing assembly, the first and second turning cavities are substantially semi-circular in cross-section.

In a further embodiment of the foregoing assembly, the first passageway is inward of the second and third passageways relative to an exterior wall of an airfoil.

In a further embodiment of the foregoing assembly, the second passageway extends along one of a pressure and a suction side wall of the airfoil, and wherein the third passageway extends along the other of the pressure and the suction side wall of the airfoil.

In a further embodiment of the foregoing assembly, the airfoil is a stator vane.

In a further embodiment of the foregoing assembly, a platform of the stator vane includes a recess receiving the cover.

In a further embodiment of the foregoing assembly, the cover is integrally formed as a single structure, and is formed separately from the airfoil.

A gas turbine engine according to an exemplary aspect of the present disclosure includes, among other things, a source of cooling fluid, and an airfoil. The airfoil includes including a radial end, a first passageway having an outlet at the radial end, and a second passageway having an inlet at the radial end. The first passageway is fluidly coupled to the source of cooling fluid. The engine further includes a cover having at least one turning cavity configured to direct fluid expelled from the outlet of the first passageway into the inlet of the second passageway.

In a further embodiment of the foregoing engine, the airfoil is a stator vane within a turbine section of the engine.

In a further embodiment of the foregoing engine, the source of cooling fluid is a compressor of the engine.

In a further embodiment of the foregoing engine, the cover includes a first turning cavity and a second turning cavity, the airfoil includes a third passageway having an inlet at the radial end, the first turning cavity is configured to direct a first portion of the fluid expelled from the outlet of the first passageway into the inlet of the second passageway, and the second turning cavity is configured to direct a second portion of the fluid expelled from the outlet of the first passageway into the inlet of the third passageway.

In a further embodiment of the foregoing engine, the cover includes a flow divider between the first turning cavity and the second turning cavity.

In a further embodiment of the foregoing engine, the flow divider is substantially convex and the first and second turning cavities are substantially concave when viewed from an interior of the cover.

In a further embodiment of the foregoing engine, the first and second turning cavities are radially spaced-apart from a core airflow path of the gas turbine engine.

A cover for a component of a gas turbine engine according to an exemplary aspect of the present disclosure includes, among other things, a first turning cavity, a second turning cavity, and a flow divider between the first and second turning cavities. When viewed from an interior of the cover, the flow divider is substantially convex and the first and second turning cavities are substantially concave.

In a further embodiment of the foregoing cover, the first and second turning cavities are substantially semi-circular in cross-section.

In a further embodiment of the foregoing cover, the cover further includes a flange provided about a perimeter of the cover. Further, the first and second turning cavities, the flow divider, and the flange are integrally formed as a single structure.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The drawings can be briefly described as follows:

FIG. 2 is a perspective view of an example airfoil assembly, and illustrates an example cover from an exterior perspective.

FIG. 3 illustrates the cover of FIG. 2 from an interior perspective.

DETAILED DESCRIPTION

Figure 1:
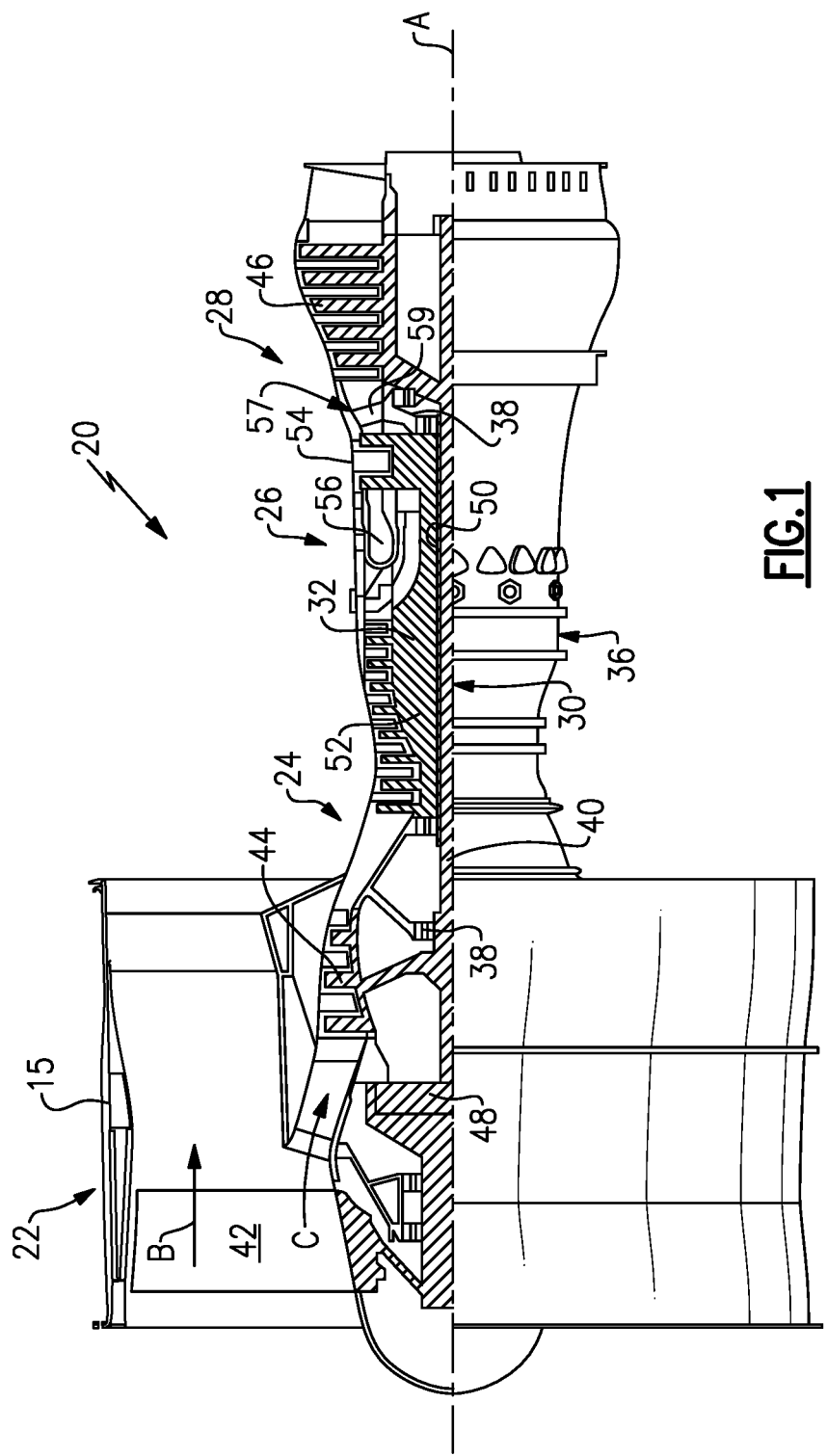
FIG. 1 schematically illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core airflow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

FIG. 2 illustrates an example assembly 60 including an engine component and a cover. In this example, the assembly 60 includes an airfoil 62 and a cover 64. As shown, the airfoil 62 is a stator vane. It should be understood, however, that this disclosure may apply to other components of a gas turbine engine, such as rotor blades or blade outer air seals (BOAS). Further, in one example, the assembly 60 is used within a turbine section of the gas turbine engine 20. However, it should be understood that this disclosure has applicability within other sections of an engine.

The airfoil 62 includes an airfoil section 66 extending radially (in a radial direction, which is normal to the engine central longitudinal axis A) between a radially inner platform 68 and a radially outer platform 70. The "radially inward" and "radially outward" directions are labeled in FIGS. 2 and 4, and are oriented normal to the engine central longitudinal axis A. The airfoil section 66 spans between a leading edge 71 and a trailing edge 73, and includes opposing pressure and suction side walls 72, 74.

In this example, the cover 64 is provided adjacent the radially inner platform 68. In other examples, the cover may be positioned adjacent the radially outer platform 70. The radially inner platform 68 includes a recess 76 configured to receive the cover 64. In particular, the cover 64 includes a flange 78 which extends about the perimeter of the cover 64. The recess 76 is shaped to correspond to the contour of the flange 78. Alternatively, the flange 78 could sit on the radially inner platform 68. In that case, no recess 76 would be required.

In this example, as illustrated in FIG. 3, the flange 78 includes a leading portion 78L, a trailing portion 78T, and pressure and suction side portions 78P, 78S. The leading portion 78L is arranged adjacent the leading edge 71 of the airfoil section 66, and has a first width $W_1$. The first width $W_1$ is greater than a second width $W_2$ of the trailing portion 78T on the opposite side of the cover 64. The overall width of the cover 64 is tapered from the width $W_1$ to the width $W_2$ to substantially correspond to the contour of the airfoil section 66.

In this example, the cover 64 and the airfoil 62 are separately formed structures. The airfoil 62 may be formed using any known technique. The cover 64 may be made of a high temperature metallic material, such as a nickel-based alloy, and is also formed using any known type of machining process. For instance, the cover 64 could be formed using additive manufacturing, casting, or stamping, to name a few examples. Further, the entire cover 64 in this example is integrally formed as a single structure.

In one example, the cover 64 is connected to the airfoil section 66 by welding between an end face 80 (FIG. 4) of the flange 78 and a radial end 82 of the airfoil section 66. While welding is mentioned herein, other connecting techniques may be used.

Figure 4:
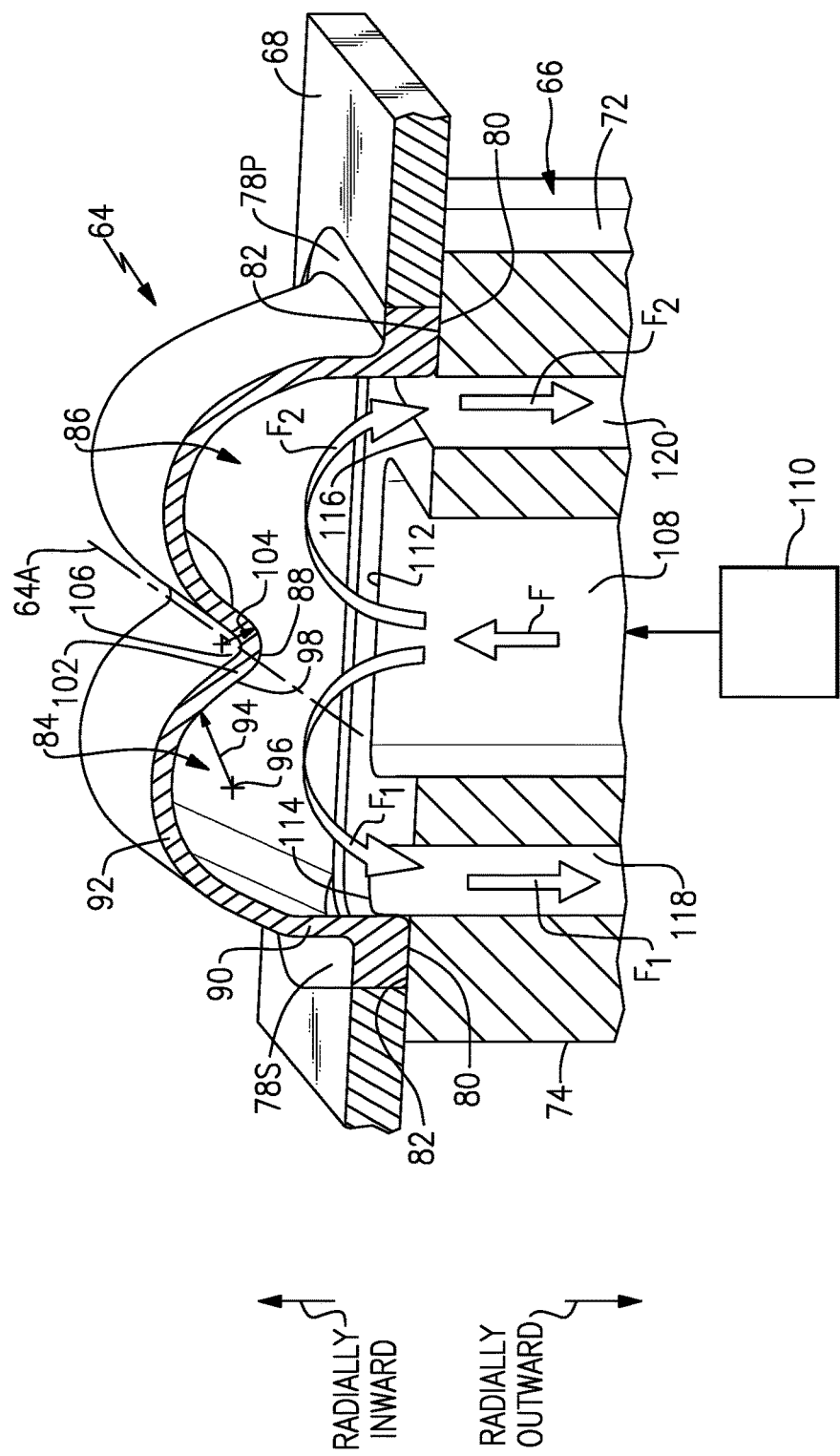
FIG. 4 is a cross-sectional view taken along line 4-4 from FIG. 2.

The interior of the cover 64 provides at least one turning cavity, which is configured to direct a flow of fluid from one passageway within the airfoil section 66 to another. With reference to FIGS. 3-4, the example cover 64 includes first and second turning cavities 84, 86 separated by a flow divider 88. The flow divider 88 extends substantially parallel to a central cover axis 64A. The cover 64 is substantially symmetrical about the central cover axis 64A in this example. One half of the cover 64 will now be described in detail. It should be understood that the remaining half of the cover 64 is arranged in substantially the same way.

Beginning at the suction side portion 78S of the flange 78, the cover 64 includes a vertical wall portion 90 connecting the suction side portion 78S to a first arcuate wall 92. The vertical wall portion 90 is not required in all examples. In those instances, the first arcuate wall 92 can extend all the way to the flange 78. The first arcuate wall 92 substantially follows a contour defined by a constant radius 94 having an origin 96 provided within the interior of the cover 64. The first arcuate wall 92 is substantially semi-circular (i.e., the first arcuate wall 92 has an arc that measures substantially 180 degrees) in cross-section. The first arcuate wall 92 follows this substantially constant radius 94 until an inflection point 98. When viewed from the interior of the cover 64 (e.g., when viewed as oriented in FIG. 3, or when viewed from a bottom perspective relative to the FIG. 4 orientation), the first turning cavity 84 is substantially concave. The first arcuate wall 92 need not follow a constant radius in all examples, and in other examples may be elliptical, for instance.

At the inflection point 98, the first arcuate wall 92 transitions to a second arcuate wall 102, which defines the flow divider 88. The second arcuate wall 102 follows a substantially constant radius 104 having an origin 106 located on the exterior of the cover 64 in this example. When viewed from the interior of the cover 64, the flow divider 88 is substantially convex. The second arcuate wall 102 then transitions into another substantially concave wall (when viewed from the interior of the cover 64) to define the second turning cavity 86. Again, the cover 64, in this example, is substantially symmetrical about the central cover axis 64A, and thus it should be understood that the second turning cavity 86 would be arranged in substantially the same way as the first turning cavity 84. The curved nature of the flow divider 88 and the first and second turning cavities 84, 86 reduces pressure losses in the fluid F while providing an effective turning geometry.

The airfoil section 66 includes a plurality of fluid passageways formed therein for directing a flow of cooling fluid F within the interior of the airfoil 62. The cooling fluid F cools the airfoil 62 and protects the airfoil 62 from exposure to the relatively high temperature fluid within the core airflow path C of the engine 20. In this example, the airfoil section 66 includes an interior passageway 108 configured to communicate fluid F from a source 110, such as a high pressure compressor, at a radially outward location. The interior passageway 108 has an outlet 112 at the radial end 82 of the airfoil section 66. At this point, the fluid F is expelled from the outlet 112 and enters the interior of the cover 64. Within the cover 64, the fluid F is divided by the flow divider 88 into first and second flows $F_1$, $F_2$. The first and second flows $F_1$, $F_2$ are turned by a respective turning cavity 84, 86 toward inlets 114, 116 in respective exterior passageways 118, 120. In this example, the flows $F_1$, $F_2$ make a complete U-turn (or, a complete 180 degree turn) from the radially inward direction to the radial outward direction. In other examples, the flows $F_1$, $F_2$ are turned greater than or less than 180 degrees. The inlets 114, 116 are provided at the radial end 82 and direct fluid to a radially outward location. In this example, the interior passageway 108 is inward of, relative to an exterior wall of the airfoil section 66, the first and second exterior passageways 118, 120.

In the illustrated embodiment, the cover 64 is arranged such that the flow divider 88 is provided at substantially a center of the interior passageway 108. Further, the respective pressure and suction side portions 78P, 78S are provided outward of the first and second exterior passageways 118, 120 such that the cover 64 fluidly couples the interior passageway 108 to the first and second exterior passageways 118, 120.

The cover 64 is further arranged such that the first and second turning cavities 84, 86 are radially spaced-apart (e.g., radially inward) of a gas path wall, which, in this example, is defined by the radially inner platform 68. Thus, as the cooling fluid F turns within the turning cavities 84, 86, the cooling fluid F is distanced from the fluid within the core airflow path and is thus maintained at a relatively low temperature as it enters the first and second exterior passageways 118, 120.

Further, the passageways 108, 118, and 120 are relatively straight, and extend in a radial direction substantially normal to an engine central longitudinal axis A. Since the passageways are relatively straight, they are relatively easy to manufacture. The passageways 108, 118, and 120 do not need to be straight in all examples. At any rate, the disclosed arrangement provides an effective cooling scheme while also reducing the complexity of manufacturing the internal passageways of the airfoil section 66.

While in the illustrated embodiment the cover 64 is configured to direct flow from a central, interior passageway 90 to passageways extending along the pressure side and suction side walls 72, 74, the cover 64 could be arranged in other ways. For example, the cover 64 could be configured to direct fluid to passageways extending along the leading edge 71 and/or the trailing edge 73 of the airfoil section 66, for example.

Further, in the illustrated embodiment, the flow divider 88 is provided substantially along the central fitting axis 64A to provide approximately half of the fluid F to the first exterior passageway 118 and half of the fluid F to the second exterior passageway 120. The flow divider 88, however, could be shifted to provide an imbalance of flow when it is desirable to direct more flow to a particular passageway. Additionally, while only two exterior passageways 118, 120 are shown, it should be understood that the cover 64 could be used to direct fluid to additional exterior passageways. Also, while not expressly mentioned above, the cover 64 may have an exterior shape that substantially follows the above-discussed interior shape, as dictated by a thickness of the cover, which is selected based on the expected pressure of the cooling fluid F.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A method, comprising:
an airfoil including a radial end, a first passageway having an outlet at the radial end, and a second passageway having an inlet at the radial end; and
   forming a cover separately from the airfoil, the cover including at least one turning cavity configured to direct fluid expelled from the outlet of the first passageway into the inlet of the second passageway;
   wherein the airfoil is a stator vane and the cover is attached to a platform of the stator vane.

2. The method as recited in claim 1, wherein the cover is integrally formed as a single structure.

3. An assembly for a gas turbine engine, comprising:
an airfoil including a radial end, a first passageway having an outlet at the radial end, and a second passageway having an inlet at the radial end;
a cover formed separately from the airfoil and including a first turning cavity and a second turning cavity;
wherein the airfoil includes a third passageway having an inlet at the radial end;
wherein the first turning cavity is configured to direct a first portion of a fluid expelled from the outlet of the first passageway into the inlet of the second passageway; and
wherein the second turning cavity is configured to direct a second portion of the fluid expelled from the outlet of the first passageway into the inlet of the third passageway.

4. The assembly as recited in claim 3, wherein the cover includes a flow divider between the first turning cavity and the second turning cavity.

5. The assembly as recited in claim 4, wherein, when viewed from an interior of the cover, the flow divider is substantially convex and the first and second turning cavities are substantially concave.

6. The assembly as recited in claim 5, wherein the first and second turning cavities are substantially semi-circular in cross-section.

7. The assembly as recited in claim 3, wherein the first passageway is inward of the second and third passageways relative to an exterior wall of an airfoil.

8. The assembly as recited in claim 7, wherein the second passageway extends along one of a pressure and a suction side wall of the airfoil, and wherein the third passageway extends along the other of the pressure and the suction side wall of the airfoil.

9. A method, comprising:
using a cover formed separately from an airfoil and including at least one turning cavity configured to direct fluid expelled from an outlet of a first passageway of the airfoil at a radial end into an inlet of a second passageway of the airfoil at the radial end; and
wherein the airfoil is a stator vane and the cover is attached to a platform of the stator vane.

10. The method as recited in claim 9, wherein a source of the fluid is a compressor of an engine.

11. A gas turbine engine, comprising:
a source of cooling fluid;
an airfoil including a radial end, a first passageway having an outlet at the radial end, and a second passageway having an inlet at the radial end, the first passageway fluidly coupled to the source of cooling fluid;
a cover formed separately from the airfoil and including a first turning cavity and a second turning cavity;
wherein the airfoil includes a third passageway having an inlet at the radial end;
wherein the first turning cavity is configured to direct a first portion of the fluid expelled from the outlet of the first passageway into the inlet of the second passageway; and
wherein the second turning cavity is configured to direct a second portion of the fluid expelled from the outlet of the first passageway into the inlet of the third passageway.

12. The engine as recited in claim 11, wherein the cover includes a flow divider between the first turning cavity and the second turning cavity.

13. The engine as recited in claim 12, wherein, when viewed from an interior of the cover, the flow divider is substantially convex and the first and second turning cavities are substantially concave.

14. The engine as recited in claim 11, wherein the first and second turning cavities are radially spaced-apart from a core airflow path of the gas turbine engine.

* * * * *